United States Patent [19]

Lövqvist

[11] Patent Number: 4,706,411
[45] Date of Patent: Nov. 17, 1987

[54] PLANT GUARD

[75] Inventor: Bo Lövqvist, Gävle, Sweden

[73] Assignee: Strumpfabriken Vinetta Aktiebolag, Östersund, Sweden

[21] Appl. No.: 833,506

[22] Filed: Feb. 20, 1986

Related U.S. Application Data

[63] Continuation of Ser. No. 572,934, Jan. 20, 1984, abandoned.

[30] Foreign Application Priority Data

Jan. 21, 1983 [SE] Sweden ................................ 8300313

[51] Int. Cl.⁴ .............................................. A01G 13/10
[52] U.S. Cl. ......................................... 47/30; 53/576; 383/37
[58] Field of Search ..................... 47/26, 28, 30, 31, 73, 47/74, 76–78, 84, 9, 20; 53/576, 577, 469, 390, 449, 567, 175; 383/37, 41, 66, 67, 118, 117, 121

[56] References Cited

U.S. PATENT DOCUMENTS

| | | | |
|---|---|---|---|
| 735,217 | 1/1959 | Robbins | 47/84 |
| 1,060,116 | 4/1913 | Oters | 47/30 |
| 1,807,819 | 6/1931 | Altgelt | 294/68.21 |
| 1,894,506 | 1/1933 | Wilson | 47/73 |
| 1,926,053 | 9/1933 | Morgan | 47/31 |
| 2,989,828 | 6/1961 | Warp | 47/84 X |
| 3,184,890 | 5/1965 | McKey | 47/73 |
| 3,315,408 | 4/1967 | Fisher | 47/9 |
| 3,380,220 | 4/1968 | Jennings et al. | 53/567 X |
| 3,662,490 | 5/1972 | Childs | 47/76 X |
| 3,709,263 | 1/1973 | Jackson et al. | 47/76 X |
| 3,788,003 | 1/1974 | Creighton et al. | 47/77 X |
| 3,828,473 | 8/1974 | Morey | 47/30 X |
| 4,006,561 | 2/1977 | Thoma et al. | 47/84 X |
| 4,016,678 | 4/1977 | Larsen | 47/77 |
| 4,109,442 | 8/1978 | Maasbach | 47/76 X |
| 4,133,164 | 1/1979 | Mintz | 53/576 X |
| 4,170,097 | 10/1979 | Floet et al. | 47/84 X |
| 4,333,265 | 6/1982 | Arnold | 47/74 |
| 4,350,678 | 9/1982 | Palvarini et al. | 47/9 X |
| 4,357,884 | 11/1982 | Rast | 47/73 X |
| 4,395,844 | 8/1983 | Jopson | 47/31 |

FOREIGN PATENT DOCUMENTS

| | | | |
|---|---|---|---|
| 6157680 | 2/1982 | Australia . | |
| 569503 | 1/1959 | Canada | 47/84 |
| 0049122 | 7/1982 | European Pat. Off. . | |
| 114798 | 8/1984 | European Pat. Off. | 47/76 |
| 1804926 | 5/1970 | Fed. Rep. of Germany . | |
| 2605076 | 8/1977 | Fed. Rep. of Germany | 47/78 |
| 2814679 | 10/1979 | Fed. Rep. of Germany | 47/78 |
| 482008 | 2/1917 | France | 47/31 |
| 633293 | 1/1928 | France | 47/73 |
| 2330309 | 3/1977 | France . | |
| 7511932 | 4/1977 | Netherlands | 47/78 |
| 8005568 | 5/1982 | Netherlands | 47/78 |
| 8203460 | 4/1984 | Netherlands | 47/84 |
| 415627 | 10/1980 | Sweden . | |
| 415855 | 11/1980 | Sweden . | |
| 420672 | 10/1981 | Sweden . | |
| 422397 | 3/1982 | Sweden . | |
| 231957 | 3/1969 | U.S.S.R. . | |

OTHER PUBLICATIONS

U.S. Pat. No. 3,747,293, issued Jul. 1973.

Primary Examiner—Robert A. Hafer
Assistant Examiner—Danton DeMille
Attorney, Agent, or Firm—Nils H. Ljungman

[57] ABSTRACT

An arrangement for providing a plant with a guard which has the form of a net, foil or the like and which is effective against insect attack, the arrangement including an applicator which has a plant through-passage (3) and which is arranged to carry a plurality of hose-like plant guards (17) which surround the aforementioned passage and which are provided with means (19) for stripping the plant guards from the applicator when a plant moved through the passage is caused to pass out from the applicator. A plant guard (17) included in the arrangement comprises a first portion (21), arranged to surround at least the lower part of the plant above the ground, and a second portion (25) intended to surround the plant in the ground. The first guard portion is capable of decomposing in an atmospheric environment within the space of a few years, while the second guard portion is capable of decomposing in the soil environment in a much shorter space of time.

20 Claims, 4 Drawing Figures

PLANT GUARD

CROSS REFERENCE TO CO-PENDING APPLICATION

This is a continuation of application Ser. No. 572,934 (Attorney Docket No. NHL-KOF-05), filed on Jan. 20, 1984, now abandoned, entitled "A Plant Guard And A Method And Machine For Its Manufacture", is assigned to the same assignee as the instant application and is incorporated herein by reference as if the text thereof was fully set forth herein.

BACKGROUND OF THE INVENTION

1. Field of the Invention:

The present invention relates to an arrangement for providing plants, and in particular forestry plants of the ball-root and bare-root kind, with an effective guard against insects and animals.

2. Description of the Prior Art:

The problem of attack on newly planted forestry plants by pine weevil and other insects, and the high economic losses caused thereby, is one which is generally known to the art. It is the lower part of the plant stem which is particularly liable to attack, and consequently various methods of protecting the stem of a plant have been proposed. Various kinds of sleeves have been tried and tested to this end, both within the Swedish Forestry Industry and within the forestry industries of other countries.

It is known that plants need to be assisted with respect to nutrient supply, thereby to enable them to survive more easily during their early years of growth.

OBJECTS OF THE INVENTION

The prime object of the present invention is to provide a plant guard and a method by which the guard can be applied in a simple manner, so as to obtain a fully satisfactory result while lying within reasonable economic limits.

A further object of the invention is to provide the plants with a store of nutrients in conjunction with applying a plant guard thereto.

SUMMARY OF THE INVENTION

The protective effect afforded by a plant guard need last no longer than about five years. At the end of this period of time, the plant is considered capable of withstanding attacks by insects or animals. Furthermore, the extent to which insect attacks take place in a clear-felled area decreases after a few years. The guard should have decomposed or broken down by the end of this period. In view hereof, the material from which the guard is made should be selected partly with respect to the fact that the upper part of the guard is subjected to the effects of sunlight, rain and wind, and partly with respect to the fact that the lower part of the guard is subjected to the effects of the moisture and organisms in the ground. It is desirable for the upper part of the guard to provide effective protection for from four to five years, and for the lower part of the guard to quickly begin to break down, so as to provide room for the roots of the plant to develop.

The aforementioned objects and desiderata are realised by an arrangement according to the present invention, which is characterised by an applicator which has a through-passage for plants and which is arranged to support a plurality of hose-like plant guards which encircle said passage and which are provided with means for stripping said plant guards from said applicator when a plant moved through said passage is caused to pass out of said applicator.

The plant guards can be placed on the applicator, either in complete or partial overlapping relationship, or may be arranged in contiguous relationship, with no overlapping.

The applicator can be mounted on a carrier carried by the person planting the plants although it is preferably supported on an elongate support which can be inserted into the ground, suitably so that the applicator can be adjusted in different positions.

The plant guard according to the invention may comprise a first portion, which is intended to surround at least the lower part of the plant above the ground, and a second portion which is intended to surround the plant beneath the ground, wherewith the first guard portion is capable of decomposing under the influence of atmospheric elements within the space of a few years, while the second guard portion is capable of decomposing under the influence of the soil environment in a much shorter space of time. The aforesaid second guard portion can be provided with plant nutrients, for example by immersing the same into a solution of such nutrients. In this respect, the second guard portion is made from a material which will absorb the nutrient solution and deliver nutrients to the plant after the plant has been planted.

BRIEF DESCRIPTION OF THE DRAWINGS

Invention will now be described in more detail with reference to a number of embodiments thereof illustrated in the accompanying drawings, in which.

DESCRIPTION OF THE PREFERRED EMBODIMENTS

Figure 1:
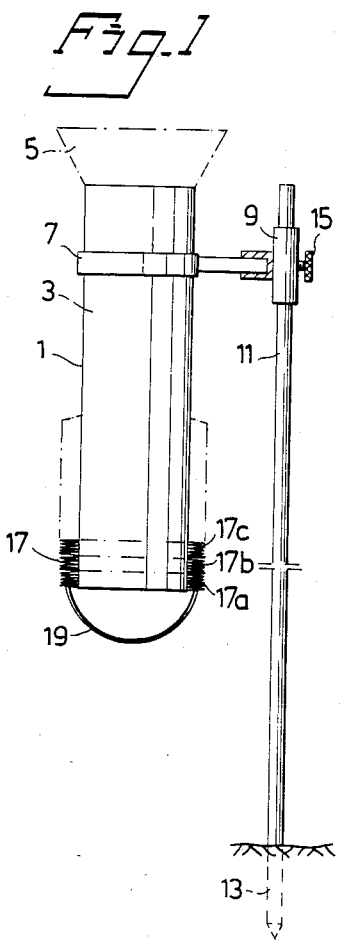
FIG. 1 illustrates the applicator in side view and partially in vertical section.

FIG. 1 illustrates one embodiment of an applicator having ground support means according to the invention. The applicator comprises a tubular body 1, which has an interior passage 3, down through which plants to be planted are intended to be passed. As indicated by broken lines, insertion of the plants into the tube 1, can be facilitated by providing the upper end of the tube with a funnel-shaped member 5. The tube 1, is carried by an arm 7, which is pivotably and suitably lockably connected to a coupling means 9, which in turn is displaceable along a ground support means 11, having the form of a straight tube or corresponding post means, with an end portion 13 which can be inserted into the ground. The coupling means 9 can be locked in a selected position along the ground support means, by means of a locking screw 15, or equivalent device. This arrangement enables the applicator to be adjusted to different heights and to different angles relative to the plane of the ground.

A plurality of plant guards 17 can be fitted around the tube 1. As indicated in FIG. 1, the plant guards are packed close together on the tube in a compressed state, although they may be packed on the tube in a non-compressed state while partially or totally overlapping one another.

Figure 2:
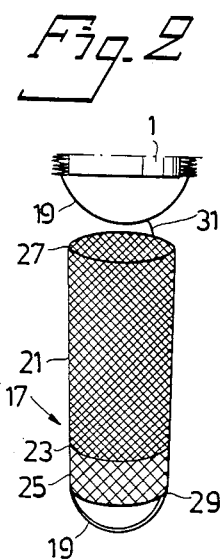
FIG. 2 illustrates a plant guard for the protection of part of the plant.
Figure 3:
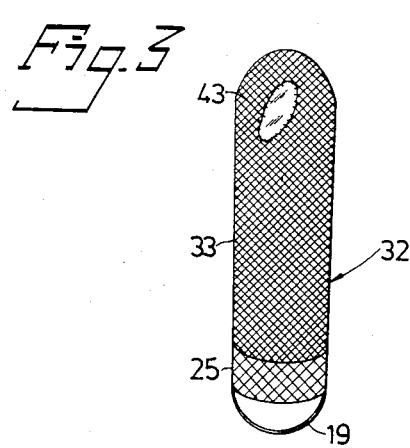
FIG. 3 illustrates a plant guard for protecting the whole of the plant.

Hanging from the outermost plant guard 17, in FIG. 1 the lowermost plant guard 17a, is a strip-off-means (or engaging means) or hang-tag 19 formed from a length of flexible material, e.g. wire or strap, whose ends are attached at mutually spaced, suitably diametrically opposed locations at the lower end of the hose-like plant guard, see also FIGS. 2 and 3. Optionally, more than one strip-off means can be provided on each plant guard. The strip-off means (or engaging means), of the lower most plant guard 17a extends approximately transversely of the interior passage 3 of the tube 1.

When a plant is released down through the passage 3 of the tube 1, the plant will strip-off the lower most or outermost plant guard 17a, but only this guard, from the tube 1 through the agency of the depending strip-off means 19, as described in more detail hereinafter with reference to FIG. 2. At the same time as the plant strips the plant guard 17a from the tube 1, the plant guard is extended to the state illustrated in FIGS. 2 and 3, while surrounding said plant. The plant is then ready for planting.

FIG. 2 illustrates a first embodiment of a plant guard according to the invention, in a non-compressed or extended state. The plant guard comprises an upper portion 21 having the form of a hose-like net which is arranged to surround and protect the lower part of the plant, up to a point located from about 1 to 2 dm above the surface of the ground, this part of the plant being that which is most sensitive to insect attack. The portion 21 may have a mesh size of about 1–3 mm, and is made from a material, for example nylon, polyethelene or the like, which can be decomposed by the effect of sunlight and atmosphere over a time period of up to about 5 years, so as not to inhibit the normal development of the plant. Normally, after about four to five years no guard is necessary, since insects are only liable to attack the plant during the first years of its growth after planting.

The upper guard portion 21 connects at its lower end 23 with a lower guard portion 25, which is intended to surround and protect that part of the plant which will be located beneath the ground surface. The guard portion 25 is also in the form of a hose, and comprises a net having a mesh size of about 1–5 mm. The portion 25 is made from a material, such as cotton, which can be broken down by the moisture and micro-organisms in the soil, in a relatively short space of time, since that part of the plant beneath the ground surface develops relatively quickly and, moreover, does not require to be protected against animals for any great length of time.

The upper end of the guard portion 21 and/or the lower end of the guard portion 25 may be provided with ties 27 and 29 respectively, for closing, e.g. tying together said end or ends respectively, if so desired. This is not illustrated in detail, since such expedients form part of the known art.

FIG. 2 illustrates how a plant guard 17 is connected at its upper end to the strip-off means 19 of the next adjacent plant guard, by means of a thread 31. The thread 31, for example cotton thread, is extremely brittle and serves only to ensure that, when a plant guard has been stripped off, for example 17a in FIG. 1, the strip-off means 19 of the next following plant guard, eg. 17b in FIG. 1, is positioned so as to cross the passage 3 of the tube 1, i.e. adopts approximately the same position as the strip-off means 19 illustrated in FIG. 1. When this has taken place, the thread 31 breaks, so as to prevent premature stripping of the next following plant guard.

FIG. 3 illustrates another embodiment of a plant guard 32 according to the invention, intended to protect the whole of the plant, both above and beneath the ground surface.

The plant guard 32 has a lower portion 25 with strip-off means 19 similar to the FIG. 2 embodiment, but has an upper portion 33 which is longer than the corresponding portion 21 of the guard illustrated in FIG. 2, so that said upper portion is able to enclose the whole of that part of the plant located above the ground surface. The free end of the portion 33 of the plant guard can be gathered and tied, either completely or partially as illustrated at 43.

The guard portions 25 and 33 have the form of a hose-like net and are made of a corresponding material to the guard portions 25 and 21 illustrated in FIG. 2.

Figure 4:
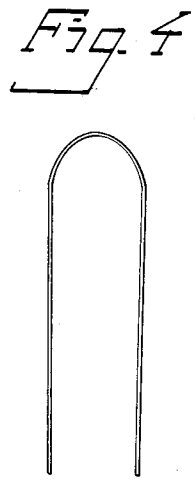
FIG. 4 illustrates a support means for holding up the plant guard, to provide room for the plant to grow.

FIG. 4 illustrates a simple, rigid U-shaped or V-shaped plant support means, made of a decomposable material and intended to be inserted into the tube 1 at the same time as the plant, so that the plant and the support means are enclosed together in the plant guard 32 illustrated in FIG. 3. The plant guard 32, however, can be used with or without the support means. When a support means is used, the whole plant is protected for several years. Without the support means, only the lower part of the plant located above the ground surface will be afforded multi-year protection, which is sufficient, however, in certain cases.

In both embodiments illustrated in FIGS. 2 and 3, the lower portion 25 of the plant guard can be dipped into or impregnated with a plant nutrient substrate, which is progressively delivered to the plant and promotes its growth. It is also possible, in a similar manner, where so permitted, to apply to the lower portion 25 and/or the upper portion 21 and 33 of respective plant guards an insecticide which while being environmentally safe is effective against any animal for which the mechanical guard illustrated in the aforegoing is not fully effective, although this should only apply in the most rare of circumstances, however.

The following advantages are examples of those afforded by the invention:

the plant guard can be applied to a plant at the planting locations or at the nurseries;

the plant guards are fitted quickly, normally in only a few seconds;

plant and guard form a readily handled unit;

the guard requires but small space and has a negligible weight;

the guard will remain for that number of years considered desirable, since the decomposition time can be determined by the choice of material used.

the guard is also effective against insects which attack the plants from below;

the guard does not prevent the sunlight from reaching the plant;

the guard is elastic and does not prevent the plant from growing;

the lower part of the guard can be provided with a nutrient solution, which increases the ability of the plant to survive and to grow.

The invention is not restricted to the illustrated and described embodiments, but can be modified and varied in many ways within the scope of the invention.

What is claimed is:

1. A plurality of plant guards attached together in a sequence, said plant guards being adapted to protect a plant when planted in the ground against attack by pests, each plant guard comprising:

a knitted hose-shaped net structure adapted to form a protective casing around the plant when expanded, said hose-shaped net structure having a lower portion for enclosing at least a portion of the root structure of the plant and an upper portion for enclosing at least a portion of the remainder of the plant;

said lower portion having a terminal end opening; and engaging means having at least one thread for spanning said terminal end opening and integral with said lower portion for engaging the root structure of the plant.

2. A plurality of plant guards according to claim 1, wherein said upper portion comprises insect repellent means for repelling insects from said upper portion.

3. A plurality of plant guards according to claim 1, wherein said lower portion comprises plant nutrients.

4. A plurality of plant guards according to claim 1, wherein said upper portion comprises insect repellent means for repelling insects from said upper portion, and wherein said lower portion comprises plant nutrients.

5. A plurality of plant guards according to claim 1, wherein said lower portion comprises material which will at least partially decompose in about one year when disposed at least partially in soil.

6. A plurality of plant guards according to claim 1, wherein said top portion comprises material which will decompose in about three to about five years when disposed above ground.

7. A plurality of plant guards according to claim 1, wherein said lower portion comprises cotton.

8. A plurality of plant guards according to claim 1, wherein said hose-shaped net structure has mesh openings with dimensions of about 1 mm to about 5 mm.

9. A plurality of plant guards according to claim 1, wherein said plant guard comprises a synthetic material.

10. A plurality of plant guards according to claim 1, wherein said plant guard comprises animal repellent means for repelling animals therefrom.

11. A method of applying a sequence of plant guards to a multiplicity of seedlings in a sequence to protect said seedling when planted in the ground, each of said plant guards comprising a knitted hose-shaped net structure having a lower portion for enclosing at least a portion of the root structure of the seedling and an upper portion for enclosing at least a portion of the remainder of the seedling, said lower portion having a terminal end opening, each of said plant guards additionally comprising integral engaging means having at least one thread for spanning said terminal end opening and integral with said lower portion for engaging the root portion of the seedling and an easily torn thread interconnecting said upper portion to the lower portion of an immediately subsequent plant guard in said sequence, said method comprising the steps of:

providing a generally tubular applicator having an entrance and an exit;

mounting said sequence of plant guards on said applicator adjacent said exit, said plant guards being in a generally compressed state and encircling said applicator;

positioning one of said engaging means of one of said plant guards at said exit;

passing one of said seedlings through said applicator, from entrance to exit, such that the root structure of said seedling engages said at least one thread of said one engaging means of said one of said plant guards at the exit of said applicator;

extracting said one seedling from the exit of said applicator, thereby encircling and protecting said seedling with said plant guard and thereby positioning a subsequent engaging means at said exit;

moving said one seedling away from said applicator so as to fracture said easily torn thread interconnecting said upper portion of said one plant guard to said lower portion of an immediately sebsequent plant guard; and repeating the above said steps.

12. A plurality of plant guards accordings to claim 1, wherein an easily torn thread interconnects said upper portion of said plant guard to the lower portion of an immediately subsequent plant guard in said sequence of plant guards.

13. A plurality of plant guards according to claim 12, wherein said upper portion comprises insect repellent means for repelling insects from said upper portion.

14. A plurality of plant guards according to claim 12, wherein said lower portion comprises plant nutrients.

15. A plurality of plant guards according to claim 12, wherein said upper portion comprises insect repellent means for repelling insects from said upper portion, and wherein said lower portion comprises plant nutrients.

16. A plurality of plant guards according to claim 12, wherein said lower portion comprises material which will at least partially decompose in about one year when disposed at least partially in soil.

17. A plurality of plant guards according to claim 12, wherein said top portion comprises material which will decompose in about three to about five years when disposed above ground.

18. A plurality of plant guards according to of claim 12, wherein said lower portion comprises cotton.

19. A plurality of plant guards according to claim 12, wherein said hose-shaped net structure has mesh openings with dimensions of about 1 mm to about 5 mm.

20. A plurality of plant guards according to claim 12, wherein said plant guards comprises a synthetic material.

* * * * *